UNITED STATES PATENT OFFICE.

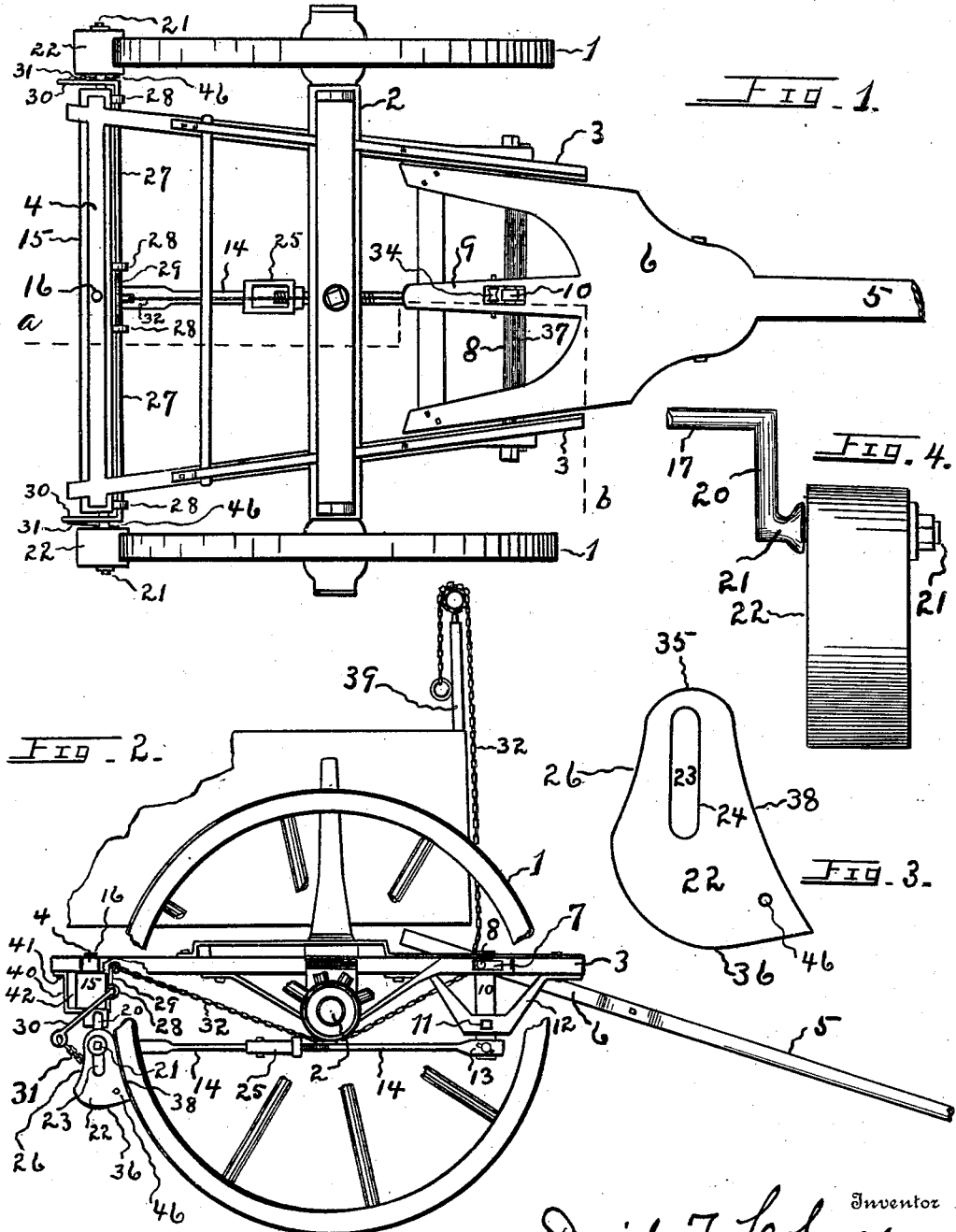

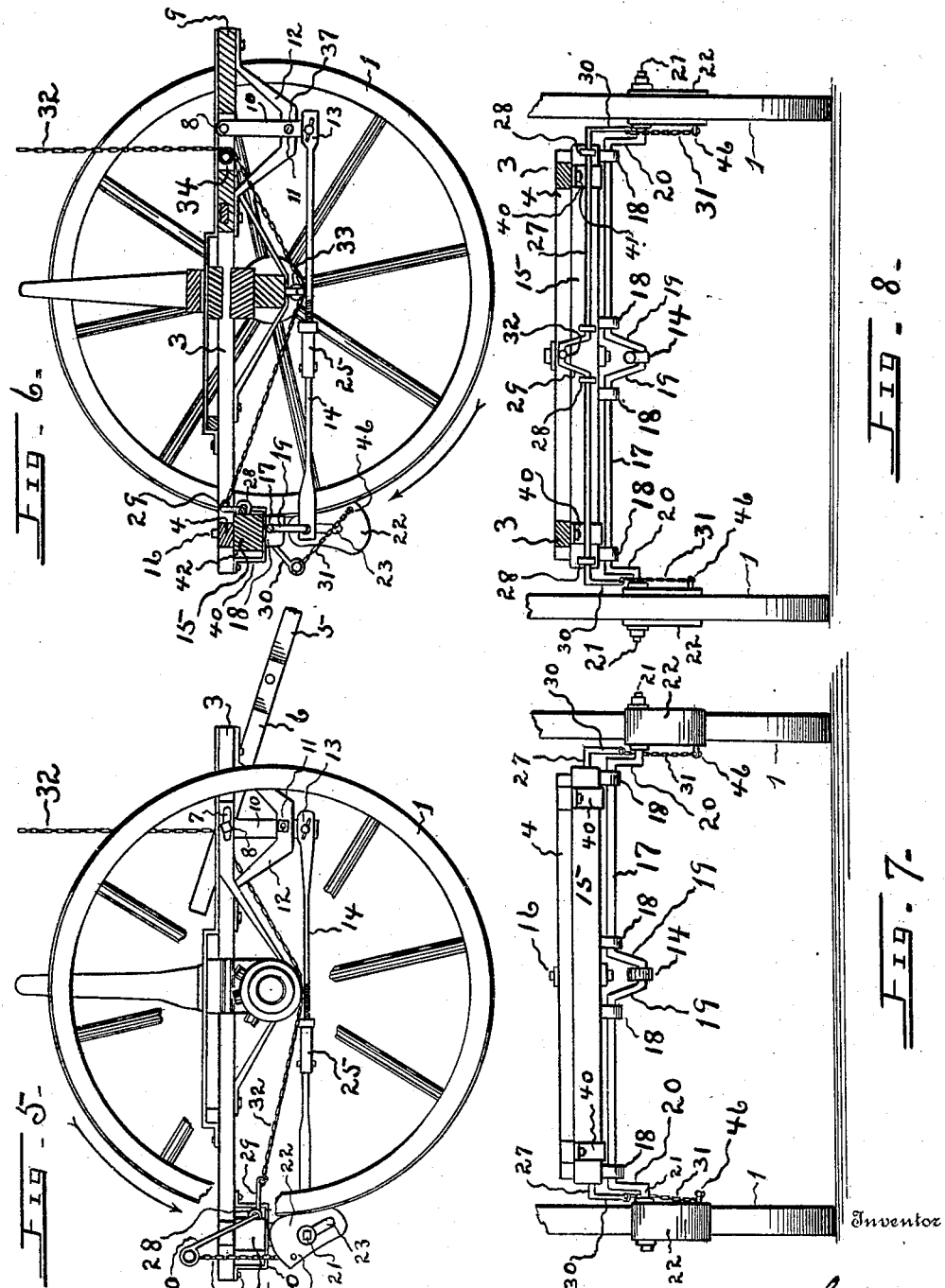

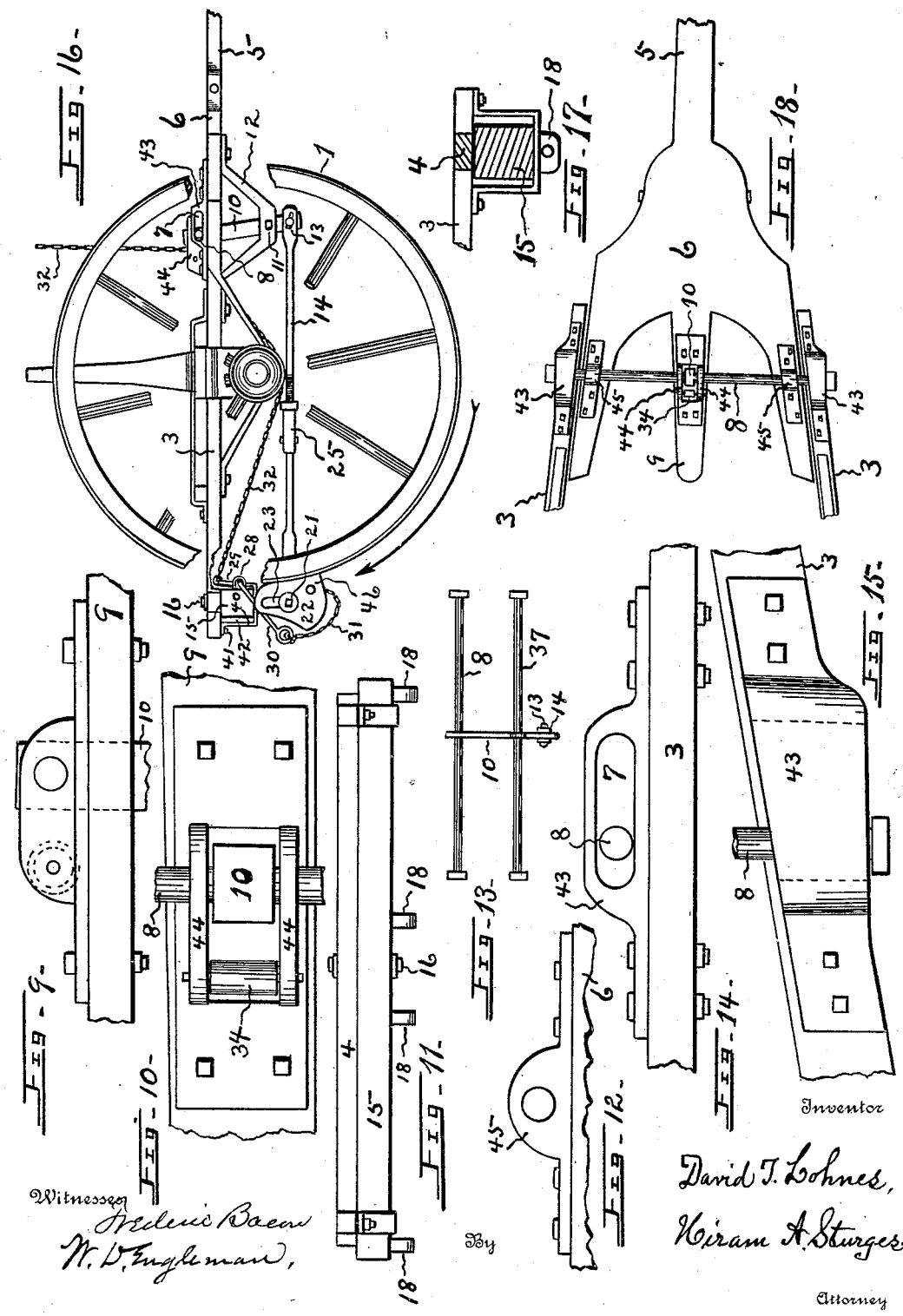

DAVID T. LOHNES, OF OMAHA, NEBRASKA.

VEHICLE-BRAKE.

No. 886,828.  Specification of Letters Patent.  Patented May 5, 1908.

Application filed July 29, 1907. Serial No. 385,942.

*To all whom it may concern:*

Be it known that I, DAVID T. LOHNES, a citizen of the United States, residing at Omaha, in the county of Douglas and State of Nebraska, have invented certain new and useful Improvements in Vehicle-Brakes, of which the following is a specification.

This invention relates to improvements in vehicle brakes intended for use upon heavy draft wagons, but may be used upon vehicles generally.

The primary object of the invention is to present a vehicle brake of few parts which will be economical in construction and reliable in operation.

The invention belongs to that class of brakes where the vehicle tongue is slidable between the hounds of the vehicle, as when driving down an incline; the brakes in such case engage the wheels without any attention of the driver, the rearward movement of the tongue being caused by the "hold back" action of the team.

The invention has reference to certain novel features fully explained herein and includes slidable shoes which operate to effectually brake the wheels when the vehicle is passing down an incline, said shoes adapted also to be inverted under control of the driver to brake the wheels when driving up a long incline, this feature being useful to allow the team to rest, whenever desired.

With these and other objects in view the invention presents a new combination and arrangement of parts as described herein, pointed out by the claims and illustrated in the drawings, wherein,—

Figure 1 represents a front part of a wagon, being a broken away plan view, and showing my invention mounted thereon. Fig. 2 is a broken away, side view of the front part of a wagon, showing thereon the invention operatively mounted. Fig. 3 is an enlarged end view and Fig. 4 is a side view of one of the shoes, the latter view showing the shoe mounted upon one of the levers. Fig. 5 is a view somewhat similar to that shown in Fig. 2, the shoe being inverted. Fig. 6 is a view sectioned on line *a b* of Fig. 1, to clearly illustrate relative position of parts. Figs. 7 and 8 are, respectively, rear and front views of the brake beam, to clearly show mounting thereon and use of U-shaped levers, the upper part of wheels being broken away. Figs. 9, 10, 12, 14 and 15 are enlarged details relating to Figs. 16 and 18, being side and plan views of metal straps for use upon the tongue-head and hounds for mounting the tongue-rod; the parts to which the straps are secured being broken away. Fig. 11 is a rear view of the brake beam and hounds, to more clearly show use of yokes or loops thereon to prevent separation of these parts during the "backing" movement hereinafter described. Fig. 13 is a detail relating to Figs. 1, 2, 5 and 6, to clearly show the mountings of lever 10. Fig. 17 is a transverse sectional view of the brake beam and arm 4 of the hounds. Figs. 16 and 18 are, respectively, broken away side and plan views, showing certain parts of my invention and illustrating the use of straps for mounting the tongue-rod.

Referring now to the drawings for a more particular description, numeral 1 indicates the front wheels and 2 the axle of a vehicle, 3 indicating the side-arms and 4 the transverse arm of the hounds. The tongue is indicated at 5 and tongue-head at 6, and the latter is adapted to have a slight degree of lengthwise movement between arms 3 of the hounds, as when the team moves forward or is backing. A lengthwise extending slot 7 is formed near the front end of each arm 3; tongue-rod 8 is secured transversely in tongue-head 6 and has a seating within slots 7, and, as is apparent, when the tongue-head performs its lengthwise sliding movement between arms 3 of the hounds, the distance of such movement will be limited by the length of slots 7.

Disposed below the middle prong 9 of the tongue-head is lever 10; this lever occupies a vertical position, generally, and is mounted between its ends upon the horizontal sustaining-rod 37, the ends of rod 37 being supported at 11 upon any convenient angle irons 12, the latter being secured upon and beneath arms 3; the upper end of lever 10 is pivotally mounted upon tongue-rod 8 (Figs. 1, 13, 18), the lower end of said lever being mounted pivotally at 13 upon the front end of link 14.

I construct the brake beam 15, pivotally secured midway between its ends as by means of bolt 16 upon the transverse arm 4 of the hounds with which it extends parallel, and upon and along the lower side of the brake beam I mount the braking link 17, as upon ears 18. Link 17 is preferably formed as an iron or steel rod bent at its center to form a U-shaped crank 19 and bent transversely near its ends to form cranks 20, and cranks 20 are bent to form the horizontal extensions or shoe supports 21, and upon the latter I mount brake-shoes 22. The brake-shoes, best shown in Figs. 3 and 4 are provided with parallel ends, although this is not important; they are provided with slots 23 which extend a part of the length of the shoes, and the slots are formed transversely with reference to said parallel ends; extensions 21 have seatings within these slots.

Link 14 is disposed midway between the front wheels, its rear end being pivotally mounted upon crank 19, and, as is obvious, a limited backward sliding movement of the tongue and tongue-head, ordinarily caused by the neck-yoke and team when going down an incline, will cause a forward movement of link 14. This movement of link 14 will cause the shoes to engage the circular surface of the wheels, and since the movement of the wheels are in directions indicated by the arrow in Fig. 6 or in Fig. 16, the shoes will be pressed upward and will travel or slide upward to the position shown in Fig. 16, thereby effectually preventing rotative movement of the wheel; while the shoes slide upward they are supported upon extensions 21, these extensions being seated in slots 23 of the shoes, and since the outer wall 38 (Fig. 3) of each shoe is downwardly divergent from wall 24 of the slot, the shoes operate as wedges, at this time to make a close frictional contact with the wheels, and by this construction, conduce to the usefulness of the invention.

Link 14 may be adjusted as to its length by means of turnbuckle 25, and this feature is important since the shoes may become worn, or may require adjustment as to a proper contact with the wheels; also since brake beam 15 is pivotally mounted at 16, any inequality in the wearing surface of the shoes is compensated thereby, and the brake beam will have a limited swinging movement whenever one of the shoes becomes worn more than its mate, so that both shoes will be pressed against the wheels with a force sufficient to cause them to slide upwardly upon their supports and to become wedged, as shown in Fig. 16, between the surface of the wheels and extensions 21. As soon as the tongue-head slides forward between arms 3, link 14 has a rearward movement, and the distance between extensions 21 and the surface of the wheels is made greater, and the shoes readily drop downward and are supported slightly adjacent to the wheels. As thus far described the invention may be used for all practical purposes to effectually and automatically brake the wheels of a loaded vehicle when passing down an inclined way; the shoes, however, have a further usefulness, presently to be explained.

When driving a loaded wagon upward upon a long incline, it is often desirable to allow the team to rest. The driver at this time is frequently upon the load from which it is not convenient to descend to block the wheels, and therefore I employ means for inverting the shoes, and when inverted, walls 26 (Fig. 3) engage the wheels and the latter are prevented from revolving, as will be explained.

The devices employed for inverting the shoes are very simple, and consist of link 27, best shown in Fig. 8, and controlling means attached to the link. This link is pivotally supported upon the inner side of brake beam 15, as upon ears 28, and, preferably is formed as a rod of metal bent midway its ends to form the U-shaped crank 29, and bent at its ends to form transverse arms 30, the ends of arms 30 being connected to the lower part of the shoes, as by chains 31, this connection with the shoes being at 46 upon the inner ends of the latter near the lower part of walls 38; upon the extremity of crank 29 I employ any flexible member, as chain 32 which passes beneath the axle and may have a bearing upon roller or pulley 33 (Fig. 6) the latter being secured upon the lower surface of the axle, and from thence passes to roller 34 (Figs. 1, 6) mounted upon prong 9 of the tongue-head; and this chain is under control of the driver and may be extended upward any desired height upon the load, and may be conveniently secured upon the dash board 39 ready for use, as indicated in Fig. 2.

When passing up a long incline and it is desired to allow the team a rest, the driver inverts the shoes by drawing the chain outward, the parts thereby assuming the position shown in Fig. 5; the driver allows the vehicle to move backward, and since the wheels rotate at this time in the direction indicated by the arrow in Fig. 5, the wheels cause the shoes to pass downward and to become wedged between extensions 21 and the circular surfaces of the wheels. It will be noted that, at this time, walls 26 frictionally engage the wheels, and that these walls are formed divergently from the narrowed and outwardly-curved heads 35 toward the broad bases 36 of the shoes, said shoes being slidable at this time upon extensions 21 of link 17. In operating the devices to invert the shoes, only a slight force is required and the parts may be of light construction. Links could be substituted for chains, and used in connection with link 27 for inverting the shoes, but I find chains, in many respects to be preferred, both for use of the driver and to connect arms 30 with the shoes.

After the operation just described and when the vehicle begins a movement up the incline, the rotation of the wheels are in the direction indicated by the arrow in Fig. 6, and on this account the shoes are raised from their "wedged" position, by action of the wheels, without any attention from the driver; the movement of the shoes while upon their supports 21 is upward, and they swing outward from the wheels and return to their normal position, shown in Figs. 1, 2 and 6.

During the operation of inverting the shoes just described, for the purpose of allowing a rest for the team, there is a downward pressure exerted upon the brake beam, and therefore, to sustain the brake beam and cause it to be held upon the transverse arm 3 of the hounds, and to relieve the strain which, otherwise, would come upon bolt 16, I employ yokes 40, which pass under the ends of the brake beam and are secured by bolts 41 to the hounds, leaving vertical spaces 42 between the brake beam and the arms of the yokes. By this construction the brake beam is sustained, and may have the limited horizontal swing already described.

While walls 26 and 38 (Fig. 3) indicate sides of the brake shoe formed as oppositely-disposed concaved contact-surfaces, it is not considered necessary that the degree of concavity should conform in exactness to the circular shape of the wheel; the operation of the shoes, however, is more effective, when it does thus conform. It is considered important that contact-surfaces 26 and 38 be extended divergent from the head 35 toward the base 36, as this construction causes the braking to become effective, whether the load is heavy or light.

There is some objection to the formation of openings in the hounds to provide slots 7, since it decreases the strength of these parts, and I have shown in Figs. 14 and 15, straps or castings 43 which may be bolted to the hounds; and in Figs. 9 and 10 I have shown wings 44 which may be secured to prong 9 of the tongue head, and tongue-rod 8 may be supported by traversing these wings; in Fig. 12 are shown ears 45 which may also be secured to the tongue head. These castings are shown in Figs. 16 and 18 as operatively mounted upon the hounds and tongue head, and while their use does not change the function or operation of any of the parts already described, their use avoids the objectionable formation of apertures within the hounds and tongue head, and they are convenient and economical for use upon vehicles already manufactured, in connection with the invention.

Having thus given a full description, what I claim and desire to secure by Letters Patent is,—

1. The combination with the front axle, the slotted hounds and the slidable tongue between the slotted hounds, of a vertically disposed rock lever upon said hounds and having its upper end pivotally mounted upon said slidable tongue; a suitably supported braking-link disposed rearward of and substantially parallel with said axle and bent to form end-cranks and to form a central crank-lever; brake-shoes, each having sides formed as oppositely-disposed concaved contact-surfaces extended divergent from its head toward its base, and provided with a lengthwise-extending slot formed intermediate its divergent sides; a shoe support angularly formed on each of said end-cranks and seated within the slot of one of said brake-shoes; and a link extended between and having pivotal mountings upon the lower end of said rock-lever and the central crank-lever of said braking-link.

2. The combination with the front axle, the slotted hounds and the slidable tongue between the slotted hounds, of a vertically-disposed rock-lever upon said hounds and having its upper end pivotally mounted upon said slidable tongue; a suitably supported braking-link disposed rearward of and substantially parallel with said axle and bent to form end-cranks and to form a central crank-lever; brake shoes, each of said brake shoes having sides formed as oppositely-disposed concaved contact-surfaces extended divergent from its head toward its base and provided with a lengthwise-extending slot formed intermediate its divergent sides; a shoe support angularly formed on each of said end-cranks and seated within the slot of one of said brake-shoes; a lengthwise-movable link extended between and having pivotal mountings upon the lower end of said rock-lever and the central crank-lever of said braking-link, said lengthwise-movable link being longitudinally adjustable.

3. The combination with the axle, the rear hounds, the slotted hounds and the slidable tongue between the slotted hounds, of a vertically-disposed rock-lever upon said hounds and having its upper end pivotally mounted upon said slidable tongue; a brake-beam mounted upon said rear hounds and adapted to have a horizontal swinging movement; a braking-link pivotally mounted upon said brake-beam and bent to form end-cranks and to form a central crank-lever; brake shoes, each having sides formed as oppositely-disposed contact-surfaces extended divergent from its head toward its base and provided with a lengthwise-extending slot formed intermediate its divergent sides; a shoe support angularly formed on each of said end-cranks and seated within the slot of one of said brake-shoes; and a link extended between and having pivotal mountings upon the lower end of said rock-lever and the central crank-lever of said braking-link.

4. The combination with the axle, the rear hounds, the slotted hounds and the slidable tongue between the slotted hounds, of a vertically-disposed rock-lever upon said hounds and having its upper end pivotally mounted upon said slidable tongue; a brake-beam mounted upon said rear hounds and adapted to have a horizontal swinging movement; a braking-link pivotally mounted upon said brake-beam and bent to form end-cranks and to form a central crank-lever; brake-shoes, each having sides formed as oppositely-disposed contact-surfaces extended divergent from its head toward its base and provided with a lengthwise-extending slot formed intermediate its divergent sides; a shoe-support angularly formed on each of said end-cranks and seated within the slot of one of said brake-shoes; a lengthwise-movable link extended between and having pivotal mountings upon the lower end of said rock-lever and the central crank-lever of said braking-link, said lengthwise-movable link being longitudinally adjustable.

5. A brake for vehicle wheels, comprising a braking-link carried by the vehicle, said braking-link having terminal shoe-supports disposed adjacent and rearward of said vehicle wheels; brake-shoes, each having an outer and inner contact-surface extended divergent from its head toward its base, and provided with a lengthwise-extending slot formed intermediate its divergent sides; said terminal shoe-supports seated in the lengthwise-extending slots of the brake-shoes; means to cause a contact of the outer contact-surfaces of said brake-shoes with the vehicle wheels while said wheels are moving forwardly, and means to cause a contact of the inner contact-surfaces of said brake-shoes while said wheels are moving rearwardly.

6. A brake for vehicle wheels, comprising a braking-link carried by the vehicle, said braking-link having terminal shoe-supports disposed adjacent to and rearward of said vehicle wheels; brake-shoes, each of said brake-shoes having an outer and inner concavedly-formed contact-surface extended divergent from its head toward its base, and provided with a lengthwise-extending slot formed intermediate its divergent sides; said terminal shoe-supports seated in the lengthwise-extending slots of the brake-shoes; means to cause a contact of the outer concavedly-formed contact-surfaces of said brake-shoes with the vehicle wheels while said wheels are rotating forwardly, and means to cause a contact of the inner concavedly-formed contact-surfaces of said brake-shoes while said wheels are rotating rearwardly.

7. A brake for vehicle wheels, comprising a braking-link carried by the vehicle, said braking-link having terminal shoe-supports disposed adjacent to and rearward of said vehicle wheels; brake-shoes, each of said brake-shoes having an outer and inner contact-surface extended divergent from its head toward its base, and provided with a lengthwise-extending slot formed intermediate its divergent sides; said terminal shoe-supports seated within the lengthwise-extending slots of the brake-shoes; means to cause a contact of the outer contact-surfaces of said brake-shoes with the vehicle wheels while said wheels are rotating forwardly, and means to invert said brake-shoes to cause a contact of the inner contact-surfaces of said brake-shoes while said wheels are rotating rearwardly.

In testimony whereof I affix my signature in presence of two witnesses.

DAVID T. LOHNES.

Witnesses:
  HIRAM A. STURGES,
  FREDERIC BACON.